July 3, 1923.

R. BALMER

REFUSE DISPOSAL PLANT

Filed Dec. 24, 1921

1,460,566

2 Sheets-Sheet 1

Inventor
Robert Balmer
By his Attorney
Seward Davis

July 3, 1923.

R. BALMER 1,460,566

REFUSE DISPOSAL PLANT

Filed Dec. 24, 1921

Patented July 3, 1923.

1,460,566

UNITED STATES PATENT OFFICE.

ROBERT BALMER, OF TORONTO, ONTARIO, CANADA.

REFUSE-DISPOSAL PLANT.

Application filed December 24, 1921. Serial No. 524,794.

*To all whom it may concern:*

Be it known that I, ROBERT BALMER, a subject of the King of the United Kingdom of Great Britain and Ireland, and a citizen of the Dominion of Canada, and a resident of the city of Toronto, in the Province of Ontario, in said Dominion, am the inventor or discoverer of certain new and useful Improvements in Refuse-Disposal Plants, of which the following is a description.

My invention consists in certain novel features of construction of refuse disposal plants and particularly in so correlating the several structures comprising a refuse disposal unit that a maximum capacity is attained with a minimum of ground area occupied, and in so separating the structures that there is no intercommunication of vibration, and in so connecting these structures that the joints therebetween admit of play of the engaged parts while preserving air-sealed relation.

The objects of my invention are so to construct a refuse disposal plant that it may occupy a minimum ground area as a complete unit, and to this end that the several essential component structures may be vertically disposed one above the other without mutual interference and in most efficient working relation; and further to so adjust these separate structures as a composite unit that the shocks and jars to which certain of them are necessarily subjected may not be communicated as vibrations to the other elements of the unit and disturb or interfere with the machinery or other working parts supported thereby or comprising same.

Figure 1:
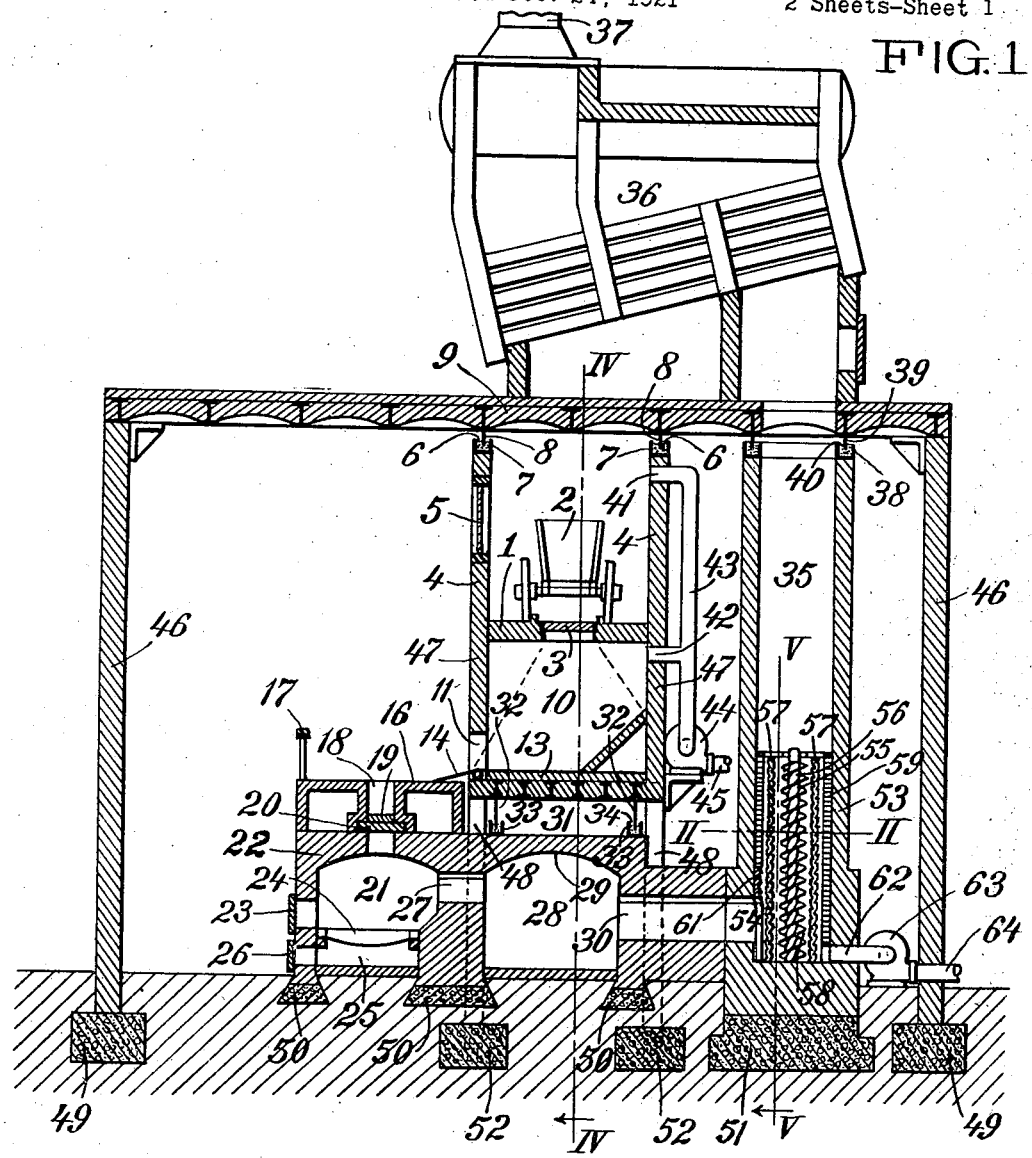
Figure 2:
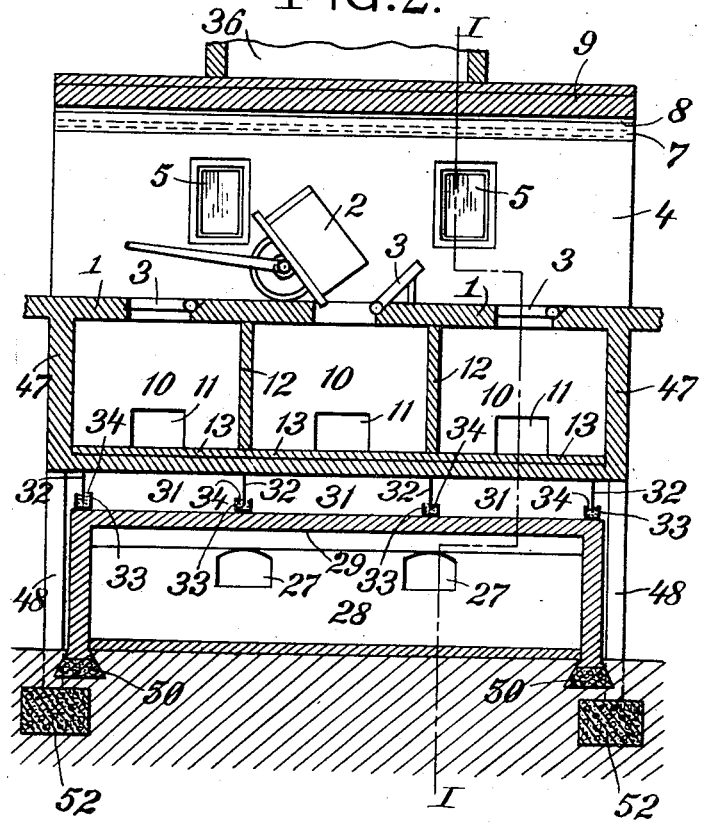

These and incidental minor objects of the invention are set forth at length in the ensuing description, and means for attaining these several objects in the best forms now known to me are illustrated in the accompanying drawings, in which Figure 1 is a vertical cross sectional view of a refuse destructor plant;

Figure 2 is a vertical cross sectional view of the destructor on the line IV—IV of Fig. 1;

Like numerals of reference indicate same or corresponding parts throughout the several figures.

In my companion application Serial No. 325,431, filed September 22, 1919, patented Jan. 16, 1923, No. 1,442,116, for methods of and apparatus for the destruction of refuse, I have shown and described a refuse disposal plant operable as a unit in which the constituent elements are vertically arranged at independent levels for convenience, efficiency and economy of operation. My present invention relates to a preferred form of construction of disposal plants of this character.

Referring to the drawings, the numeral 1 is the tipping floor or platform upon which the loaded refuse carts 2 enter the plant. 3 are the covered openings in this floor through which the loads are dumped therefrom. 4 are side walls enclosing the tipping floor, and 5 are windows for admitting light thereto. 9 is the floor above the tipping platform independently supported by the walls 46, which are the walls of the main building housing the plant and which rest upon the foundations 49. The walls 4 of the tipping platform are integral with the walls 47 enclosing a refuse storage bin 10 located immediately beneath the tipping floor. 11 are doors for the extraction of refuse from the storage bins, 12 the partition walls between these storage bins, and 13 the floor thereof. The walls 47, floor 13, walls 4, and tipping floor 1 form an integral unit supported upon the columns 48 resting upon the independent foundations 52. Vertically beneath the storage bin is the hot air chamber 31 whose floor is the crown 29 of the combustion chamber 28 situated vertically beneath this hot air chamber. The combustion chamber 28 communicates by the flue 27 with the furnace chamber 21, which is one of a battery of furnaces 22 having the sliding covers 20, whose withdrawal permits the collapse of the bottom 19 of the feeding hopper 18 located in the furnace loading platform 16, provided with a balustrade 17. From the storage bin 10 the door 11 opens upon the furnace loading platform 16, the inclined chute 14 from the door 11 resting at one end upon the furnace loading platform 16 and being hinged at the other to the bin floor 13. 23 is the furnace door, 24 the fire grate, 25 the ash pit, and 26 the ash pit door. The walls of the series of combustion chambers and of the battery of furnace chambers are each independently supported by the separate foundations 50, 50, 50. 30 is the exit flue from the combustion chamber 28, leading to the dust collector 53 located in the smoke flue 35 leading to the boiler 36, thence to chimney 37, and thence to atmosphere. 62 is an opening or pipe for extraction of dust deposited in the dust collector by means of the suction ventilator 63, and 64 is a discharge pipe therefrom. 51 is the separate and independent foundation of the smoke flue chimney.

41 is an exhaust opening for dust and fumes from the tipping floor corridor. 42 is an exhaust opening for fumes from the storage bin, both openings communicating with the pipe 43 leading to the exhaust fan 44 having the delivery pipe 45 leading in any convenient manner, not here illustrated, to the ash pits 25, as set forth in detail and for the purposes there elaborated in my companion application above referred to.

As will be seen, the several vertical walls have separate foundations mutually independent and preferably not at the same levels, and the several floors supported by these walls are each out of contact with the walls supporting the other floors, whereby shocks upon any one floor are not communicated to the other floors. Joints, however, are formed between those walls which do not support a particular floor and such floor. These joints are air-sealed, but permit mobile or variable contact, the general arrangement thereof being as follows: The walls 4 forming the corridor of the tipping platform are capped with channels 7 having upwardly extending sides constituting troughs containing sand seals 6 into which extend the downwardly depending vertical diaphragms or baffles 8 which are integral with the floor 9. Similarly, the wall of the chimney 35 is provided with a circular channel iron 38 forming by its vertically extending flanges a trough containing the sand seal 40 entered by the baffle 39 downwardly depending from the floor 9. In the same manner the hot air chamber 31 is surrounded by vertical flanges 32 extending downwardly from the floor 13 and engaging the sand seal 34 contained in the trough 33 resting upon the crown 29 of the chamber 28.

Under the conditions of installation of refuse disposal plants in municipal districts where population is dense, the arrangement of structure shown and described is the most economical for maximum efficiency with minimum ground area. It comprises essentially five levels for most advantageous operation, namely: a reception level or tipping floor, a storage level, a heating level, a combustion level, and over all a boiler level, where heat resulting from combustion may be converted and usefully applied to the operation of machinery furnishing utilities to the plant such as power and light. Such an arrangement, while highly desirable not only for the reasons stated but also because the order of sequent operations is most readily followed where advantage may be taken of gravity for the performance of part of the work to be done in moving the refuse, gives rise to certain elements of difficulty, and particularly those of vibration. When vibration is communicated from the reception and storage levels to the heating or combustion level, the tendency to destructively affect the structure of the heating and combustion chambers becomes pronounced, and also when communicated to the boiler level the tendency to interfere with the operations of the machinery becomes serious, depending of course upon the intensity of the communicated disturbances.

When a refuse destructor is functioning properly the fire brick linings of the furnace chamber, of the combustion chamber, and of the accessory smoke flues are kept incandescent. In this condition such linings are extremely brittle and liable to crack and fall apart if subjected to shocks or vibrations. In the normal operation of a destructor plant, these shocks or vibrations usually arise in two ways: First, by the passage and arrival of the heavily laden carts or vans, which jar any road or bridge over which they pass; and second by the discharge of their loads of refuse, which vary in weight from one to ten tons. This heavy mass, sometimes falling from a considerable height, produces a violent shock to the structure of the storage bin where it is kept prior to being charged into the furnace. As the fires are more conveniently fed from a bin placed as nearly as possible over the furnace, and as for the same reason of convenience the carts or vans should preferably discharge from a position above or beside the storage chamber or bin, it follows that the most convenient general relation of tipping floor, storage bin and furnace chamber is that shown in the accompanying figures. In this position of greatest operating convenience, the two sources of shock or vibration, namely the tipping floor and the refuse storage bin, are in close proximity to the furnace, combustion chambers and smoke flues, with their incandescent, brittle fire brick linings. Such proximity increases the possibility and the effects of shocks and vibrations communicated from the movement of the carts and the discharge of their loads, hence the importance of insulating the furnace and combustion chambers and smoke flues from all rigid contact with the structure containing or supporting the tipping platform and the storage bin. This is accomplished, first, by keeping the foundations separate, those carrying the tipping floor and storage bin being preferably deeper than the others; second, by keeping these structures above their foundations also free from all rigid contact.

By supporting the separate elements as shown, so that the foundation for the tipping floor also carries the storage bin, while the furnace foundation and the boiler level foundation is each supported independently of all others, mutual communication of vibrations is avoided, but passage is left between the several elements at various levels which it is desirable and even necessary to air-seal, as for example, between the boiler floor and the vertical walls of the tipping floor. At these points I provide a sealing joint by means of downwardly depending metallic baffles entering between the vertical flanges of a trough-shaped member. This trough is filled with sand into which the baffles penetrate sufficiently far to form substantially an air-seal therewith, but not far enough to afford a metal to metal contact, room being left for play resultant from shocks, vibrations or expansion.

When, as also shown in the drawings, a closed hot air chamber, heated from the waste heat of the combustion chamber, is used for improving the combustibility of the stored fuel, I provide preferably a sand seal, which prevents rigid contact between the structure of the combustion chamber and the structure of the hot air chamber of the storage bin, thus also preventing escape of the hot air to the atmosphere or the uncontrolled entrance of cold air from without.

A particular condition of the operations of a refuse destructor station is the diffusion of dust and fumes from the carts or vans at the moment of discharge. For this reason it is desirable that the tipping floor be inclosed as far as practicable, so that the problem of removing and destroying the said dust and fumes may be the more easily and completely effected. In cases where the tipping platform has its own side walls and roof, making a building independent of that covering the furnaces and other elements of the station, no further special insulating provision against the communication of shocks or vibrations from the tipping floor and storage bin is needed. But, in such a case as that shown in the drawings, where a floor carrying a boiler or other machinery is likely to be unfavorably affected by shocks and vibrations communicated from the tipping floor, and where a separate roof is undesirable, I provide a sand seal preferably, or any other convenient form of variable contact between the floor above and the side walls of the tipping platform.

In this way injurious shocks and vibrations from the refuse dumping on the tipping platform and in the storage bin are kept from affecting the delicate fire brick structure below and the building and its contents above, while at the same time the sanitary ventilation of the tipping floor is made easier.

When, as in the drawings, the smoke flue communicates with a boiler on a floor above, it is advisable to insulate the flue from any but a variable contact with the boiler or floor upon which it and accessory machinery are supported. The contact may be through a sand seal or any other mobile contact device, the purpose being to save the incandescent brickwork of the smoke flue from shocks and vibrations.

In passing the refuse from the storage bin to the feeding hopper of the furnace, some communicating chute is necessary; in this and like cases, the contact is made a flexible one, as shown in the drawings.

Having thus described my invention, I claim:

1. In a refuse destructor, a plurality of refuse-disposal elements comprising separate chambers disposed in vertical relation, within a common housing, the top of said housing being supported independently of the supports for said chambers, and the supports for one of said chambers being independent of the supports for another of said chambers.

2. In a refuse destructor having several superposed floors, refuse storing means, and refuse incinerating means separately located upon respective floors, and separate foundational supports for each floor.

3. In a refuse destructor, a chamber into which refuse is to be dumped through the top thereof onto the floor of said chamber, working units, including said chamber, at different levels, a majority of said units, including said chamber, being independently supported upon separate foundations.

4. In a refuse destructor, a chamber into which refuse is to be dumped from a higher level into said chamber preliminary to its incineration, separate foundational supports for said chamber, a combustion chamber, and separate foundational supports for its crown.

5. In a refuse destructor having a plurality of superposed floors respectively adapted to separate steps in refuse destruction, a plurality of walls separately supporting each of said floors upon independent foundations, and joints between the walls supporting a floor and the adjacent floor supported by other walls, the said joints being adapted to absorb shocks received by a floor and to dampen the resultant vibrations.

6. In a refuse destructor having a plurality of superposed floors and destructor elements arranged thereon at separate levels to permit successive handling operations to utilize gravitational force, the combination of independent supports for each floor and downwardly projecting members carried by one floor and a pair of upwardly projecting members carried by the supports of the next lower floor, and a mobile sealing medium supported between said lower pair into which medium the downwardly projecting members extend, whereby vertical motion of the upper floor is limited thereto and the joint continues sealed.

7. A refuse destructor having a plurality of floors, a refuse storage bin on an upper floor and a combustion chamber on a lower floor, an upwardly projecting partition upon one floor extending to an adjacent floor, and a downwardly projecting member depending from said adjacent floor adapted to engage in variable contact with said partition.

8. A refuse destructor having a plurality of floors, a refuse dumping corridor on an upper floor and a combustion chamber on a lower floor, sectional partitions therebetween, mobile joints between sections, and means adapted to air-seal said joints.

9. A refuse destructor having a plurality of floors, a refuse-handling corridor and storage chamber therebelow commonly supported between adjacent floors, each of which is independently supported, partitions between two of said floors, and means adapted to form mobile air-sealed joints between said partitions and the overlying floor, said means comprising vertical members constituting a trough upon one partition, a granular sealing medium therein, and a member depending from the adjoining floor and projecting downwardly into said trough and engaging said medium.

10. A refuse destructor having several floors, chambers between pairs of adjacent floors, said chambers being adapted to store refuse prior to incineration at a lower level, independent walls supporting each floor, separate foundations beneath said walls, depending baffles from one of said floors adapted to co-operate with means carried by the upwardly projecting walls of a lower floor and to form therewith joints adapted to gas-seal the several chambers.

11. In a refuse destructor, a furnace chamber whose side walls form a mobile, air-sealed closure with the overlying floor of a chamber above it.

12. In a refuse destructor, a structure having walls, a combustion chamber therein, a flue from said chamber, a floor over said structure spaced from said walls, and a connecting joint adapted to permit relative movement between said floor and said flue.

13. In a refuse destructor, a combustion chamber, a separately supported van-discharging corridor thereabove, the said corridor having a plurality of vertical walls, a floor thereover spaced from said walls, and connecting joints adapted to permit relative movement therebetween, said joints consisting of baffles extending downwardly from said floor, a trough having upwardly extending sides upon each of said walls, and a sand seal in said trough adapted to engage said baffle.

14. In a refuse destructor comprising a housing for its several elements including primary and secondary combustion chambers, a refuse storage chamber, and a van-discharging corridor having a tipping floor, means adapted to prevent the communication of vibrations from said floor and from the floor of the storage chamber therebeneath to other elements of the destructor, consisting in foundational supports common to said two floors but independent of the foundational supports of the other elements of the destructor.

15. In a refuse destructor, in superposed relation and at different levels, a boiler floor, a tipping-platform, a storage-bin, a heating chamber, and a combustion chamber, the crown of the combustion chamber, the top of the heating chamber, and the roof of the tipping platform being each severally separately supported, whereby accumulation of structural vibrations is minimized.

16. In a refuse destructor, in superposed relation and at different levels, a tipping-platform and a storage-bin, combined in one structural unit, in close proximity to, and in mobile contact with, a second structural unit, composed of a destructor furnace and combustion chamber, the second unit being supported independently of the first unit by separate foundations.

17. In a refuse destructor comprising a refuse storage chamber, a combustion chamber, and a hot-air chamber therebetween, the three chambers being in vertical relation, the hot-air chamber being formed by the bottom of the refuse storage chamber, by the crown of a combustion chamber below said hot-air chamber, and by inclosing walls, the latter out of rigid contact with the said crown, and by a mobile joint between said walls and said crown.

18. In a refuse destructor comprising a refuse storage bin and a combustion chamber, a hot-air chamber whose ceiling is common to said refuse storage bin, and whose floor is common to said combustion chamber, and whose side walls make air-sealed contact with both ceiling and floor and variable contact with one of them.

19. In a refuse destructor, a refuse storage bin and a secondary combustion chamber and intermediate these a hot-air chamber whose ceiling is common to said refuse storage bin and whose floor is common to said combustion chamber, and whose side walls make air-sealed contact with both ceiling and floor and mobile contact with one of them through the medium of a sand seal.

20. In a refuse destructor having a combustion chamber at a level below the dumping level, a tipping platform inclosed on two opposite sides by walls or partitions and by the overhead floor of a containing building and forming a passage, a joint between said walls and said floor affording a vibration-absorbing air-seal therebetween, and means adapted to control ventilation of the passage.

ROBERT BALMER.